US012677051B2

(12) United States Patent
Yang et al.

(10) Patent No.: US 12,677,051 B2
(45) Date of Patent: Jul. 7, 2026

(54) CAMERA DEVICE HAVING ADHESIVE LAYER FIXED TO PHOTOSENSITIVE ELEMENT

(71) Applicant: Chicony Electronics Co., Ltd., New Taipei City (TW)

(72) Inventors: Cheng-Hun Yang, New Taipei City (TW); Peng-Yi Hsieh, New Taipei City (TW)

(73) Assignee: CHICONY ELECTRONICS CO., LTD., New Taipei City (TW)

( * ) Notice: Subject to any disclaimer, the term of this patent is extended or adjusted under 35 U.S.C. 154(b) by 84 days.

(21) Appl. No.: 18/638,156

(22) Filed: Apr. 17, 2024

(65) Prior Publication Data

US 2025/0088723 A1     Mar. 13, 2025

(30) Foreign Application Priority Data

Sep. 7, 2023     (TW) ................................. 112134158

(51) Int. Cl.
| | |
|---|---|
| *H04N 23/54* | (2023.01) |
| *G02B 7/02* | (2021.01) |
| *H04N 23/52* | (2023.01) |

(52) U.S. Cl.
CPC .............. *H04N 23/54* (2023.01); *G02B 7/02* (2013.01); *H04N 23/52* (2023.01)

(58) Field of Classification Search
CPC ........ H04N 23/54; H04N 23/52; H04N 23/55; H04N 23/57; G02B 7/02; G02B 7/025
See application file for complete search history.

(56) References Cited

U.S. PATENT DOCUMENTS

| | | | | |
|---|---|---|---|---|
| 11,729,483 | B2 * | 8/2023 | Wang ..................... | H04N 23/54 |
| | | | | 348/335 |
| 2011/0194023 | A1 * | 8/2011 | Tam ....................... | G03B 17/02 |
| | | | | 348/374 |
| 2019/0089885 | A1 * | 3/2019 | Shen ...................... | H04N 23/51 |
| 2020/0403017 | A1 * | 12/2020 | Wang ..................... | H10F 77/50 |
| 2022/0070337 | A1 * | 3/2022 | Lee ......................... | G02B 7/021 |
| 2022/0303437 | A1 * | 9/2022 | Wang ................... | H05K 1/0274 |
| 2023/0284419 | A1 * | 9/2023 | Pang ...................... | H04N 23/55 |
| | | | | 361/704 |
| 2024/0073507 | A1 * | 2/2024 | Huang ................... | H04N 23/57 |

FOREIGN PATENT DOCUMENTS

WO      WO-2019242771  A1 * 12/2019 ............. H04N 23/00

* cited by examiner

*Primary Examiner* — Padma Haliyur
(74) *Attorney, Agent, or Firm* — MUNCY, GEISSLER, OLDS & LOWE, P.C.

(57)     ABSTRACT

A camera device includes a circuit board, a photosensitive element, a first adhesive layer, a lens assembly, and second adhesive layer. The photosensitive element has a photosensitive region and a non-photosensitive region around the photosensitive region. The first adhesive layer is adhesively fixed to the photosensitive element and the circuit board. The lens assembly includes a base and a lens disposed on the base, and the lens has an optical axis. The base includes a bottom wall and an extension member extending from the bottom wall. A limiting surface of the extension member overlaps the non-photosensitive region in a direction along the optical axis. The second adhesive layer has a positioning block and a limiting block. The positioning block is adhesively fixed to the bottom wall and the circuit board, and the limiting block is adhesively fixed to the limiting surface and the non-photosensitive region.

11 Claims, 6 Drawing Sheets

CAMERA DEVICE HAVING ADHESIVE LAYER FIXED TO PHOTOSENSITIVE ELEMENT

CROSS-REFERENCE TO RELATED APPLICATION

This non-provisional application claims priority under 35 U.S.C. § 119(a) to patent application Ser. No. 11/213,4158 filed in Taiwan, R.O.C. on Sep. 7, 2023, the entire contents of which are hereby incorporated by reference.

BACKGROUND

Technical Field

The instant disclosure relates to an optical device, in particular, to a camera device.

Related Art

Along with developments of technology, camera devices are widely used in different fields, such as personal electronic products, automobiles, and medical sciences. For example, a camera device may be installed on a computer device (such as a notebook computer or a tablet computer) to support the functions of video recording, on-line meeting, facial recognition or the like.

SUMMARY

In general, a camera device known to the inventor includes a circuit board and a photosensitive element. To make the overall thickness of the camera device thinner, the photosensitive element is assembled in the hole of the circuit board. However, such configuration although reduces the overall thickness of the camera device, the photosensitive element may be displaced or deformed upon an external force is applied to the photosensitive element, thereby affecting the quality of the image detected by the photosensitive element.

In view of this, in one embodiment, a camera device is provided. The camera device comprises a circuit board, a photosensitive element, a first adhesive layer, a lens assembly, and a second adhesive layer. The circuit board has an assembling hole, a first surface, and a second surface opposite to the first surface. The assembling hole penetrates the first surface and the second surface, and the assembling hole has an inner annular surface. The photosensitive element is in the assembling hole. The photosensitive element has a front surface, a back surface, and an outer peripheral portion. The outer peripheral portion is connected between the front surface and the back surface. The front surface has a photosensitive region and a non-photosensitive region, and the non-photosensitive region is around the photosensitive region. The first adhesive layer is adhesively fixed to the outer peripheral portion of the photosensitive element and the inner annular surface of the assembling hole. The lens assembly is disposed on the first surface, and the lens assembly comprises a base and a lens. The lens is disposed on the base, the position of the lens corresponds to the position of the photosensitive element, and the lens has an optical axis. The base comprises a bottom wall and an extension member, the bottom wall has a bottom surface, and the extension member extends from the bottom wall and has a limiting surface. The bottom surface overlaps the first surface in a direction along the optical axis, and the limiting surface overlaps the non-photosensitive region of the photosensitive element in the direction along the optical axis. The second adhesive layer is between the base and the circuit board. The second adhesive layer has a positioning block and a limiting block. The positioning block is adhesively fixed to the bottom surface of the base and the first surface of the circuit board, and the limiting block is adhesively fixed to the limiting surface of the extension member and the non-photosensitive region of the photosensitive element.

As above, according to the camera device of one or some embodiments of the instant disclosure, the extension member extends from the bottom wall of the base, the limiting surface of the extension member overlaps the non-photosensitive region of the photosensitive element in the direction along the optical axis, and the limiting block of the second adhesive layer is adhesively fixed to the limiting surface and the non-photosensitive region of the photosensitive element. Therefore, the photosensitive element is limited by the extension member, thereby enhancing the structural strength of the entire camera device. Accordingly, according to the camera device of one or some embodiments of the instant disclosure, the photosensitive element can be prevented from being displaced or deformed upon an external force is applied to the photosensitive element, so that the photosensitive element can provide proper image sensing quality.

BRIEF DESCRIPTION OF THE DRAWINGS

The disclosure will become more fully understood from the detailed description given herein below for illustration only, and thus not limitative of the disclosure, wherein.

DETAILED DESCRIPTION

It is noted that, in the embodiments, the terms "first" and "second" are provided to describe different elements, and these elements are not thus limited by using these terms. In all the figures, identical symbols are used to denote identical or similar elements.

Figure 1:
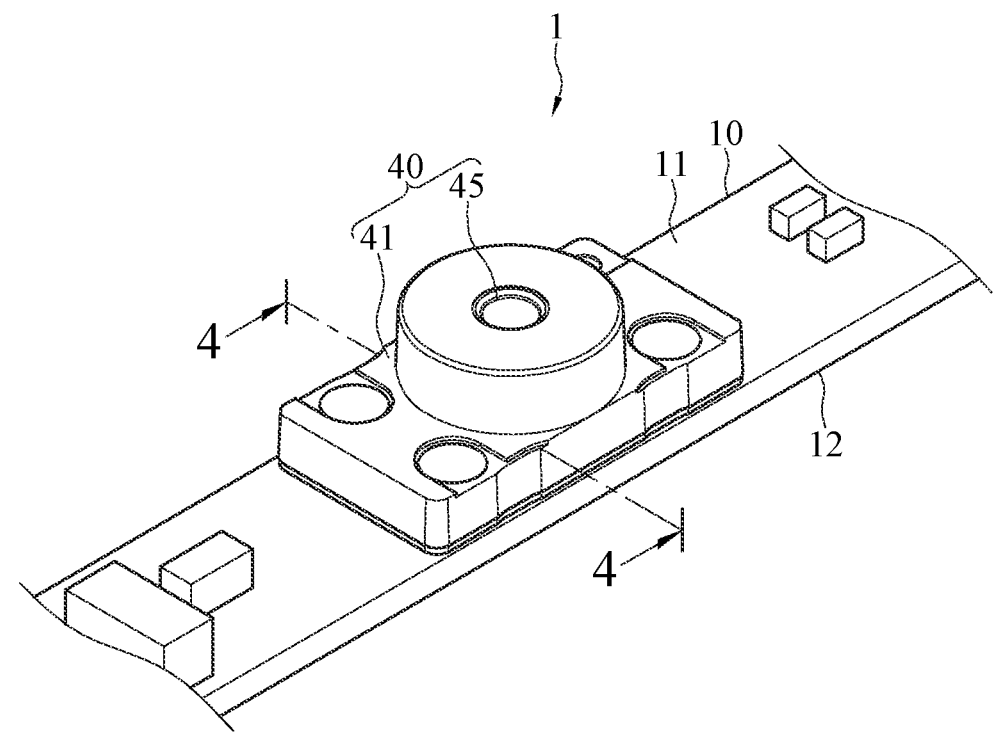
FIG. 1 illustrates a perspective view of a camera device according to an exemplary embodiment of the instant disclosure.
Figure 2:
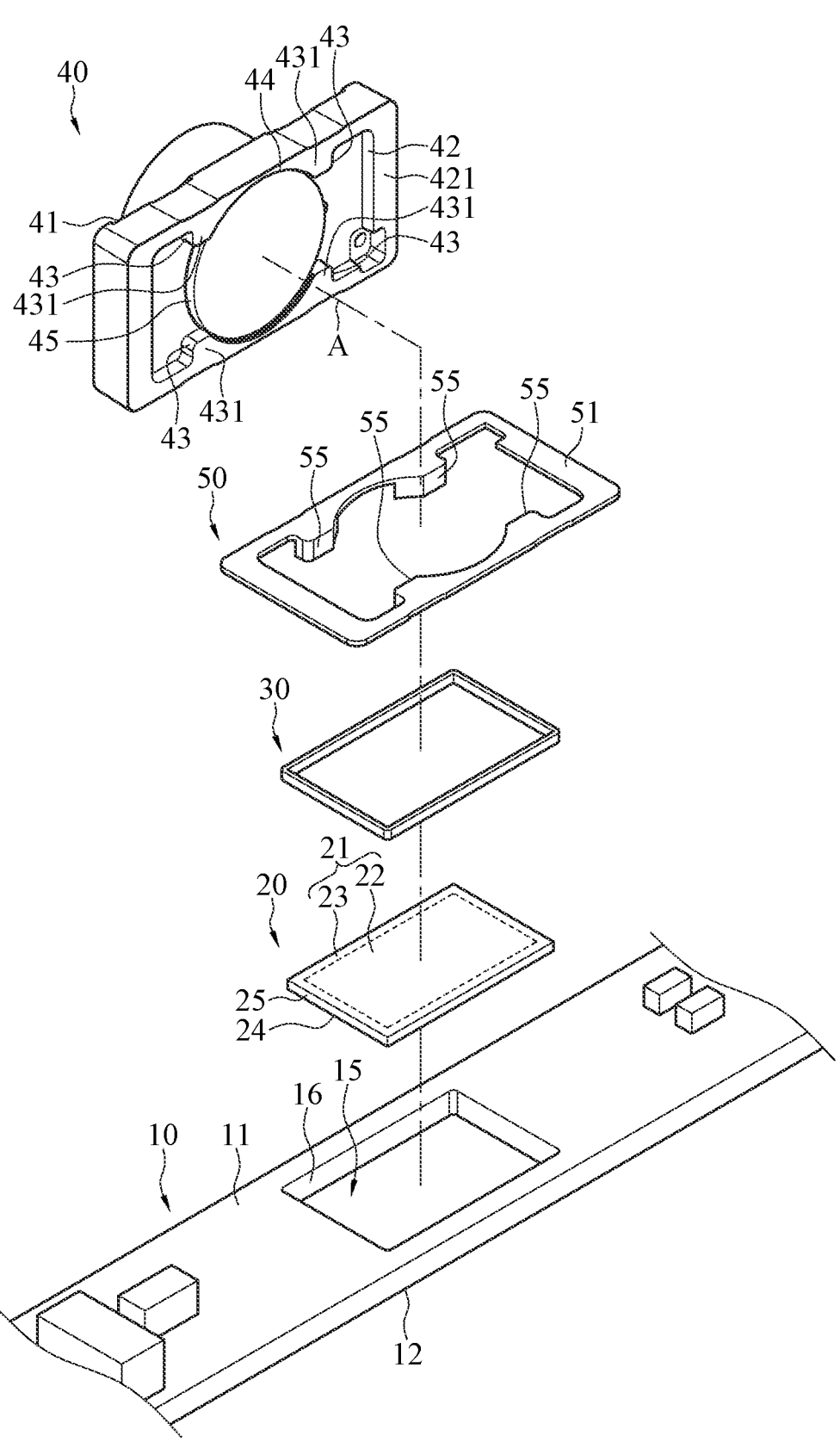
FIG. 2 illustrates an exploded view of the camera device of the exemplary embodiment of the instant disclosure.
Figure 3:
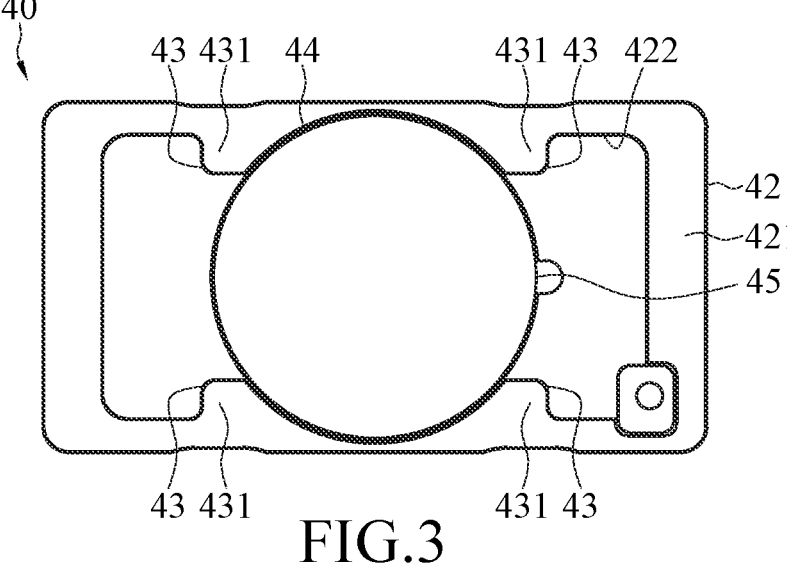
FIG. 3 illustrates a side view of the camera device of the exemplary embodiment of the instant disclosure.
Figure 4:
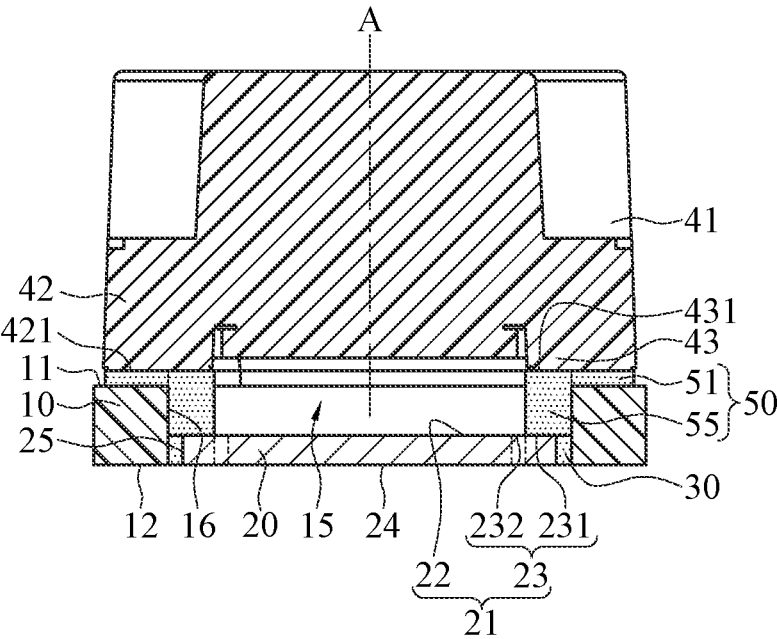
FIG. 4 illustrates a cross-sectional view along line 4-4 shown in FIG. 1.
Figure 5:
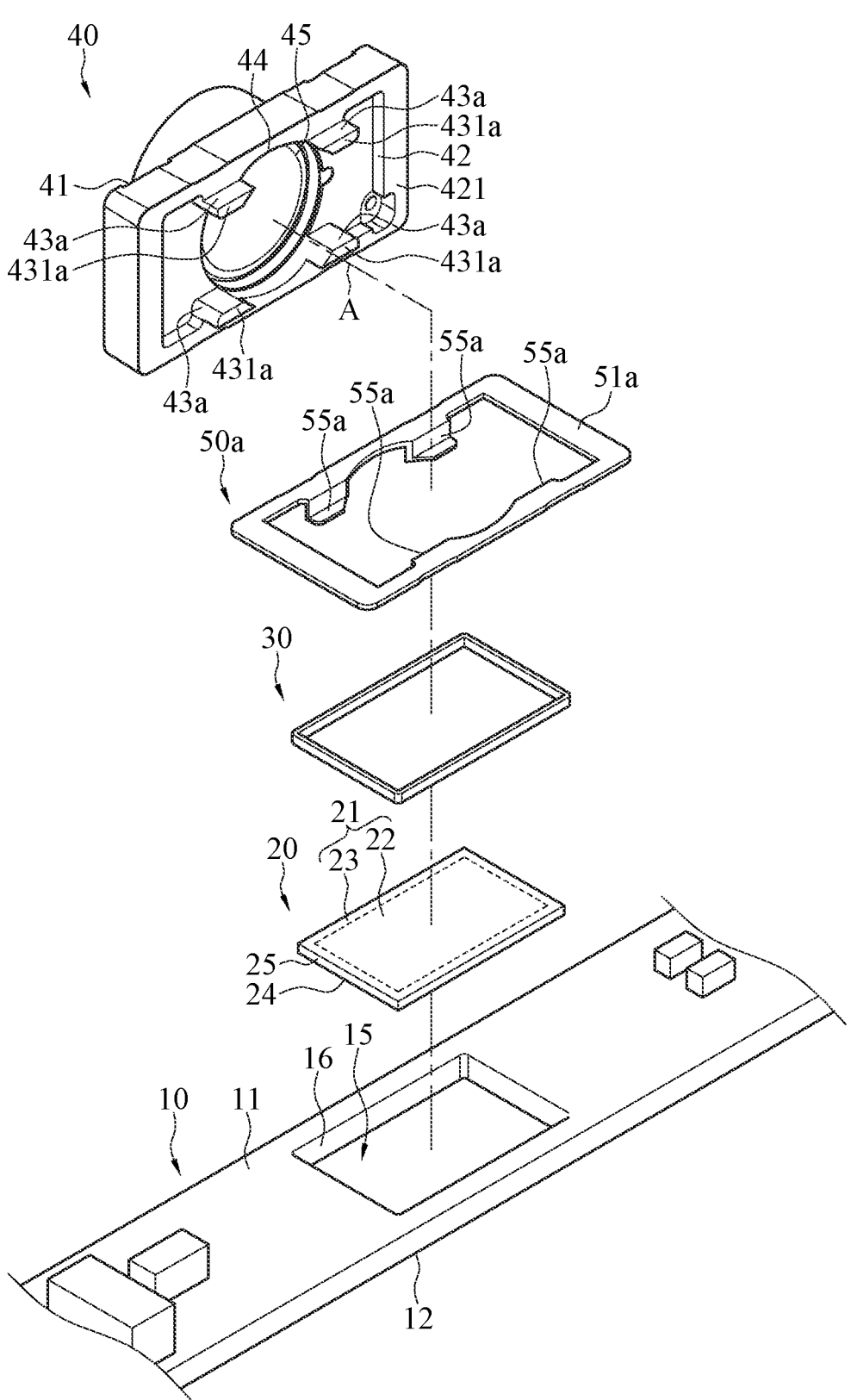
FIG. 5 illustrates an exploded view of a camera device according to another exemplary embodiment of the instant disclosure.
Figure 6:
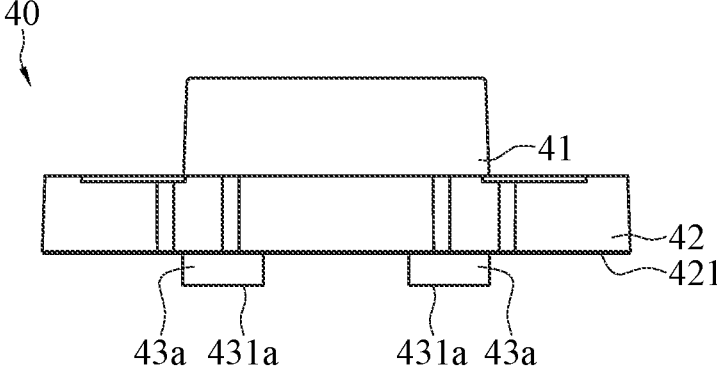
FIG. 6 illustrates a side view of the camera device of the another exemplary embodiment of the instant disclosure.
Figure 7:
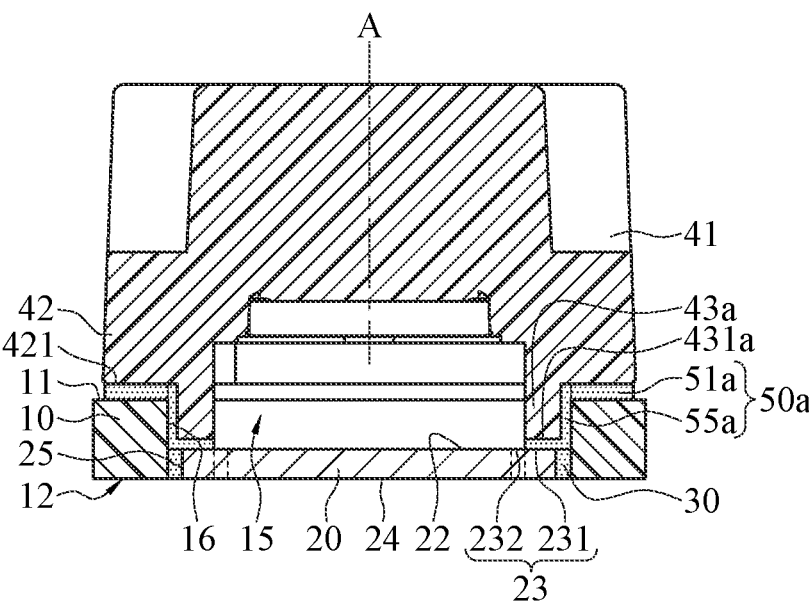
FIG. 7 illustrates a cross-sectional view of the camera device of the another exemplary embodiment of the instant disclosure.
Figure 8:
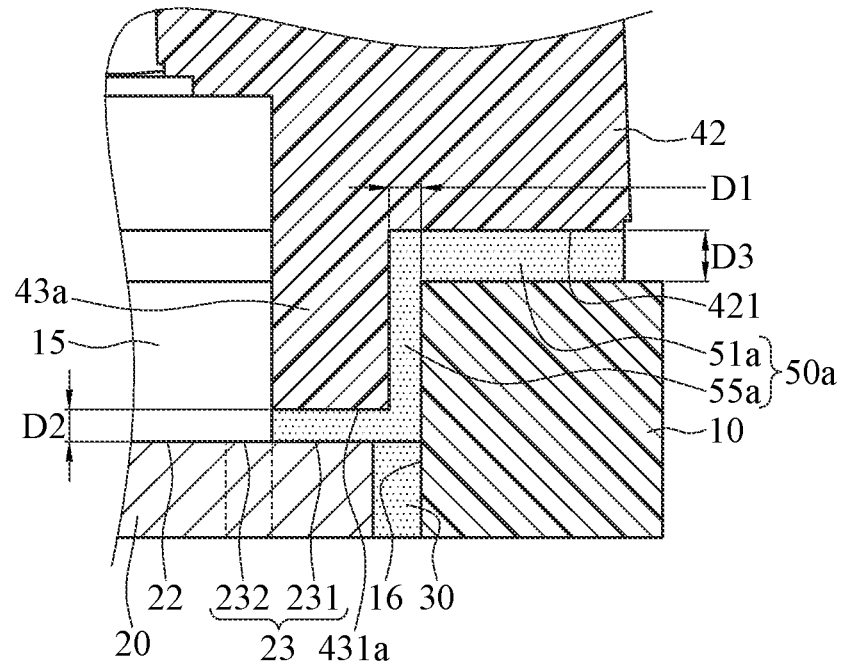
FIG. 8 illustrates an enlarged partial cross-sectional view of the camera device of the another exemplary embodiment of the instant disclosure.

FIG. 1 illustrates a perspective view of a camera device according to an exemplary embodiment of the instant disclosure. FIG. 2 illustrates an exploded view of the camera device of the exemplary embodiment of the instant disclosure. FIG. 3 illustrates a side view of the camera device of the exemplary embodiment of the instant disclosure. FIG. 4 illustrates a cross-sectional view along line 4-4 shown in FIG. 1. As shown in FIG. 1 and FIG. 2, in this embodiment, the camera device 1 comprises a circuit board 10, a photosensitive element 20, a first adhesive layer 30, a lens assembly 40, and a second adhesive layer 50. In some embodiments, the camera device 1 may be utilized in different electronic devices for capturing images around the electronic devices. For example, the camera device 1 may be utilized in mobile devices (e.g., smart phones, tablet computers, or notebook computers), cameras, or other electronic devices.

As shown in FIG. 2 to FIG. 4, the circuit board 10 has an assembling hole 15, a first surface 11, and a second surface 12 opposite to the first surface 11. The assembling hole 15 penetrates the first surface 11 and the second surface 12, and the assembling hole 15 has an inner annular surface 16. In this embodiment, the assembling hole 15 is a rectangular hole, but the instant disclosure is not limited thereto. In other embodiments, the assembling hole 15 may be a round hole, an elliptical hole, a square hole, or the like, depending on the actual product demands.

As shown in FIG. 2 to FIG. 4, the photosensitive element 20 is in the assembling hole 15. The photosensitive element 20 has a front surface 21, a back surface 24, and an outer peripheral portion 25. The outer peripheral portion 25 is connected between the front surface 21 and the back surface 24. The front surface 21 and the first surface 11 of the circuit board 10 face toward a same direction, and the back surface 24 and the second surface 12 of the circuit board 10 face toward a same direction. In some embodiments, the shape of the photosensitive element 20 may be rectangular (as shown in FIG. 2), round, elliptical, square, or other irregular shapes.

As shown in FIG. 2 to FIG. 4, the front surface 21 of the photosensitive element 20 has an optical-sensing region 22 and a non-photosensitive region 23. The non-photosensitive region 23 is around the photosensitive region 22. In FIG. 2 and FIG. 4, for the sake of convenience and understanding, the front surface 21 of the photosensitive element 20 is divided into the photosensitive region 22 and the non-photosensitive region 23 through a dashed line; however, it should be noted that, the dashed line does not actually exist on the front surface 21 of the photosensitive element 20. The photosensitive element 20 may be made of semiconductor materials. The photosensitive region 22 may have tiny photosensitive units for detecting external lights thereby the photosensitive region 22 can generate an image, while the non-photosensitive region 23 is a region which does not participate light detection and image generation. For example, the non-photosensitive region may be electrically connected to the circuits on the circuit board 10 for signal transmission.

In some embodiments, specifically, the photosensitive element 20 may be a charge-coupled device (CCD), a complementary metal-oxide semiconductor (CMOS), or a CMOS active pixel sensor.

As shown in FIG. 2 to FIG. 4, the first adhesive layer 30 is adhesively fixed to the outer peripheral portion 25 of the photosensitive element 20 and the inner annular surface 16 of the assembling hole 15, so that the photosensitive element 20 is fixed inside the assembling hole 15 of the circuit board. Therefore, according to one or some embodiments, through the configuration, the effects of the dusts, moisture, or other foreign matters in the ambient environment on the photosensitive element 20 can be reduced. Moreover, because the photosensitive element 20 is not stacked on the surface of the circuit board, the overall thickness of the camera device 1 can be reduced.

As shown in FIG. 2 to FIG. 4, the lens assembly 40 is disposed on the first surface 11 of the circuit board 10 and covers the assembling hole 15. The lens assembly 40 comprises a base 41 and a lens 45. The lens 45 is disposed on the base 41, and the position of the lens 45 corresponds to the position of the photosensitive element 20. Therefore, after an external light enters the camera device 1 through the lens 45, the external light can be focused on the photosensitive region 22 of the photosensitive element 20. In this embodiment, the base 41 is hollowed and has an axle hole 44. The position of the axle hole 44 corresponds to the position of the assembling hole 15 of the circuit board 10. The lens 45 is fixed in the axle hole 44 and has an optical axis A. The optical axis A may be perpendicular to the circuit board 10 and pass through a center of the lens 45, and a direction of the optical axis A may correspond to the light propagation direction.

As shown in FIG. 2 to FIG. 4, the base 41 of the lens assembly 40 comprises a bottom wall 42 and at least one extension member 43. The bottom wall 42 has a bottom surface 421. The extension member 43 extends from the bottom wall 42 and has a limiting surface 431. In this embodiment, the bottom wall 42 is a rectangular-shaped tubular wall, and the bottom surface 421 is a rectangular-shaped tubular surface, but the instant disclosure is not limited thereto. In some other embodiments, the bottom wall 42 may be a round-shaped tubular wall, an elliptical-shaped tubular wall, or a square-shaped tubular wall.

As shown in FIG. 2 to FIG. 4, the extension member 43 may be a plate or a protrusion. In this embodiment, the base 41 of the lens assembly 40 comprises a plurality of the extension members 43 (in this embodiment, four extension members 43). The extension members 43 are disposed on an inner peripheral portion 422 of the bottom wall 42 and extend toward the axle hole 44. The extension members 43 are spaced apart from each other and surround the axle hole 44. In some embodiments, the bottom wall 42 and the extension members 43 may be integrally formed as a one-piece structure (as shown in FIG. 2 to FIG. 4). Alternatively, in some other embodiments, the extension members 43 may be assembled on the bottom wall 42 through locking, adhering, engaging, or the like.

As shown in FIG. 2 to FIG. 4, the bottom surface 421 of the bottom wall 42 of the base 41 faces the first surface 11 of the circuit board 10, and the bottom surface 421 at least partially overlaps the first surface 11 in a direction along the optical axis A. The limiting surface 431 of each of the extension members 43 faces the front surface 21 of the photosensitive element 20, and the limiting surface 431 of each of the extension members 43 at least partially overlaps the non-photosensitive region 23 of the photosensitive element 20 in the direction along the optical axis A. Moreover, in this embodiment, the bottom surface 421 of the base 10 and the limiting surface 431 of each of the extension members 43 are at a same plane, but the instant disclosure is not limited thereto.

As shown in FIG. 2 to FIG. 4, the second adhesive layer 50 is between the base 41 and the circuit board 10. The second adhesive layer 50 has a positioning block 51 and at least one limiting block 55. In FIG. 4, for the sake of convenience and understanding, the second adhesive layer 50 is divided into the positioning block 51 and the limiting block(s) 55 through dashed line(s); however, it should be noted that, the dashed line(s) does not actually exist on the second adhesive layer 50. In this embodiment, the shape of the positioning block 51 corresponds to the shape of the bottom surface 421 such that the positioning block 51 is a rectangular block. The second adhesive layer 50 has a plurality of the limiting blocks 55, and the number of the limiting blocks 55 corresponds to the number of the extension members 43. The positioning block 51 of the second adhesive layer is adhesively fixed to the bottom surface 421 of the base 41 and the first surface 11 of the circuit board 10, so that the base 41 and the circuit board 10 are adhesively fixed to each other. Each of the limiting blocks 55 of the second adhesive layer 50 is adhesively fixed to the limiting surface 431 of a corresponding one of the extension members 43 and the non-photosensitive region 23 of the photosensitive element 20, so that the base 41 and the photosensitive element 20 are further adhesively fixed to each other. In some other embodiments, the coverage range of the second adhesive layer 50 may be adjusted according to actual demands. For example, the second adhesive layer 50 may cover a portion of the bottom surface 421 of the base 41 and the limiting surface 431 of each of the extension members 43, but the instant disclosure is not limited thereto.

As above, according to the camera device 1 of one or some embodiments of the instant disclosure, the extension member 43 extends from the bottom wall 42 of the base 41, the limiting surface 431 of the extension member 43 overlaps the non-photosensitive region 23 of the photosensitive element 20 in the direction along the optical axis A. Moreover, the second adhesive layer 50 is not only adhesively fixed to the bottom wall 42 of the base 41 and the first surface 11 of the circuit board 10, the second adhesive layer 50 is but also adhesively fixed to the limiting surface 431 of the extension member 43 and the non-photosensitive region 23 of the photosensitive element 20. Therefore, the photosensitive element 20 is limited by the extension member 43, thereby enhancing the structural strength of the entire camera device 1. Accordingly, according to the camera device 1 of one or some embodiments of the instant disclosure, the photosensitive element 20 can be prevented from being displaced or deformed upon an external force is applied to the photosensitive element 20, so that the photosensitive element 20 can provide proper image sensing quality. For example, when the photosensitive element 20 bears a force towards the base 41, the limiting surface 431 of the extension member 43 abuts against the photosensitive element 20 through the limiting block 55 of the second adhesive layer 50, and the bottom surface 421 of the bottom wall 42 abuts against the first surface 11 of the circuit board 10 through the positioning block 51. Therefore, the circuit board 10 and the photosensitive element 20 are combined with the base 41 through the second adhesive layer 50, so that the structural strength of the overall camera device 1 can be enhanced. Accordingly, the photosensitive element 20 can be prevented from being displaced or deformed toward the base 41, and the photosensitive element 20 can be prevented from detaching off the circuit board 10 upon an external force is applied to the photosensitive element 20.

As shown in FIG. 2 to FIG. 4, in this embodiment, the limiting block 55 of the second adhesive layer 50 is further adhesively fixed to the inner annular surface 16 of the assembling hole 15 of the circuit board 10 and the first adhesive layer 30. Therefore, the bonding strength among the circuit board 10, the photosensitive element 20, and the base 41 can be further enhanced, leading in that the displacement or deformation of the photosensitive element 20 occurs more difficultly. Accordingly, the photosensitive element 20, the first adhesive layer 30, and the circuit board 10 can be retained at the same plane, and an additional reinforcement plate is thus not necessarily needed.

For example, as shown in FIG. 2 to FIG. 4, a thickness of the photosensitive element 20 may be less than a thickness of the circuit board 10. For example, the thickness of the photosensitive element 20 may be one second or one third of the thickness of the circuit board 10, and the photosensitive element 20 is adjacent to the second surface 12. In this embodiment, the back surface 24 of the photosensitive element 20 and the second surface 12 of the circuit board are at the same plane, and the front surface 21 of the photosensitive element 20 is inside the assembling hole 15 and thus between the first surface 11 and the second surface 12 of the circuit board 12. Therefore, through the configuration that the thickness of the photosensitive element 20 is less than the thickness of the circuit board 10, the limiting block 55 of the second adhesive layer 50 can enter the assembling hole 15, and the limiting block 55 of the second adhesive layer 50 is fixed to the inner annular surface 16 of the assembling hole 15, the first adhesive layer 30, and the non-photosensitive region 23 of the photosensitive element 20.

In some embodiments, the first adhesive layer 30 and the second adhesive layer 50 may be different adhesive layers. For example, the second adhesive layer 50 may be a light curing adhesive layer. For instance, in the case that the light curing adhesive layer is an ultraviolet light curing adhesive layer, the second adhesive layer 50 is in a liquid or semi-solid state; after ultraviolet (UV) light beams are applied to illuminate the light curing adhesive layer, the second adhesive layer 50 is cured quickly so as to provide the fixation function. On the other hand, the first adhesive layer 30 may be a non-light curing adhesive layer. For instance, the non-light curing adhesive layer is a thermal curing adhesive layer; for the first adhesive layer 30, chemical reactions may occur through heating, so that the thermal curing adhesive layer is cured to provide the fixation function.

As shown in FIG. 2 to FIG. 4, in this embodiment, the second adhesive layer 50 is a light curing adhesive layer, and the first adhesive layer 30 is a non-light curing adhesive layer. During the manufacturing process of the camera device 1, the photosensitive element 20 is firstly adhesively fixed to the assembling hole 15 of the circuit board 10 through the first adhesive layer 30, and then the uncured second adhesive layer 50 is applied, corresponding to the shape of the bottom surface 421 of the base 41, on the first surface 11 of the circuit board 10 or the bottom surface 421 of the base 41. Therefore, when the base 41 is placed on the first surface 11 of the circuit board 10, the uncured second adhesive layer 50 flows to and contacts the bottom surface 421 of the photosensitive element 20, the first surface 11 of the circuit board 10, the limiting surface 431 of the extension member 43, and the non-photosensitive region 23 of the photosensitive element 20. Next, an operator can allow the position of the base 41 with respect to the circuit board 10 to be adjusted. For example, a robotic arm (not shown) may be utilized to hold the base 41, and thus the base 41 is moved with respect to the circuit board 10 to have lifting, shifting, pitching, or yawing movements by using the robotic arm, so that the relative position between the lens 45 on the base 41 and the photosensitive element 20 can be adjusted to maintain the lens 45 at a preset focal length. Next, after the base 41 is adjusted, certain light beams (for example, UV light beams) may be applied to illuminate the uncured second adhesive layer 50 to cure the second adhesive layer 50. Last, a baking procedure is applied, so that the circuit board 10, the photosensitive element 20, and the base 41 can be fixed with each other, and the manufacturing process of the camera device 1 can be achieved.

As shown in FIG. 2 to FIG. 4, the non-photosensitive region 23 of the photosensitive element 20 may be divided into an adhering region 231 and a non-adhering region 232. In FIG. 4, for the sake of convenience and understanding, the non-photosensitive region 23 of the photosensitive element 20 is divided into the adhering region 231 and the non-adhering region 232 through dashed line(s); however, it should be noted that, the dashed line(s) does not actually exist on the non-photosensitive region 23 of the photosensitive element 20. In this embodiment, the non-adhering region 232 is between the photosensitive region 22 and the adhering region 231, and the limiting block 55 of the second adhesive layer 50 is only adhesively fixed to the adhering region 231. Therefore, the limiting block 55 of the second adhesive layer 50 can be prevented from being arranged too close to the photosensitive region 22 or even contacting the photosensitive region 22 which thus affect the image detection performance.

In some embodiments, the bottom surface 421 of the base 41 and the limiting surface 431 of each of the extension members 43 may be not at the same plane. For example, as shown in FIG. 5 to FIG. 8, in which a camera device 1 according to another exemplary embodiment of the instant disclosure is illustrated. As shown in FIG. 5 to FIG. 8, the difference between this embodiment and the first embodiment is at least that, in this embodiment, each of the extension members 43a further protrudes out of the bottom surface 421 of the bottom wall 42 of the base 41, and each of the extension members 43a further extends into the assembling hole 15. Therefore, the limiting surface 431a of each of the extension members 43a is in the assembling hole 15, and thus the limiting surface 431a of each of the extension members 43a is nearer to the non-photosensitive region 23 of the photosensitive element 20 as compared with the bottom surface 421 (that is, in this embodiment, a distance between the limiting surface 431a and the non-photosensitive region 23 is less than a distance between the bottom surface 421 and the non-photosensitive region 23).

In this embodiment, the distance between the limiting surface 431a of each of the extension members 43 and the non-photosensitive region 23 of the photosensitive element 20 is reduced. Hence, when a force towards the lens 45 is applied to the photosensitive element 20, the limiting surface 431a of each of the extension members 43a provides the limiting function for the photosensitive element 20 more instantly, thereby preventing from the displacement or deformation of the photosensitive element 20. Moreover, during that the uncured second adhesive layer 50a is still flowing on the circuit board 10 or the base 41, because the distance between the limiting surface 431a of each of the extension members 43a and the non-photosensitive region 23 is reduced, the flowing speed of the uncured second adhesive layer 50a can be also reduced, and thus the uncured second adhesive layer 50a can be prevented from flowing to the photosensitive region 22 of the photosensitive element 20 to affect the image detection performance.

Moreover, as shown in FIG. 5 to FIG. 8, each of the extension member 43a extends toward the photosensitive element 20. Therefore, the contact area between the second adhesive layer 50a and each of the extension member 43a increases, thus increasing the adhesion force among the second adhesive layer 50a, the extension members 43a, and the bottom surface 421 of the bottom wall 42. For example, in this embodiment, a first spacing D1 is between each of the extension members 43a and the inner annular surface 16 of the assembling hole 15, and a second spacing D2 is between the limiting surface 431a of each of the extension members 43a and the non-photosensitive region 23 of the photosensitive element 20. A third spacing D3 is between the bottom surface 421 of the base 41 and the first surface 11 of the circuit board 10, and each of the positioning blocks 51a of the second adhesive layer 50a is adhesively fixed within the third spacing D3, so that the base 41 and the circuit board 10 are fixed to each other. Each of the limiting blocks 55a of the second adhesive layer has an L-shaped cross section and is adhesively fixed within the first spacing D1 and the second spacing D2, so that each of the limiting blocks 55a can be adhesively fixed to the inner annular surface 16 of the assembling hole 15, the first adhesive layer 30, and the non-photosensitive region 23 of the photosensitive element 20 at the same time, thereby increasing the contact area between the second adhesive layer 50a and each of the extension members 43a.

In some embodiments, at least two among the first spacing D1, the second spacing D2, and the third spacing D3 are different from each other. For example, as shown in FIG. 5 to FIG. 8, in this embodiment, the third spacing D3 is greater than the first spacing D1 and is greater than the second spacing D2, and the first spacing D1 is less than the second spacing D2. Accordingly, through the changes among the first spacing D1, the second spacing D2, and the third spacing D3, during that the uncured second adhesive layer 50a is still flowing on the circuit board 10 or the base 41, the flowing speed of the uncured second adhesive layer 50a can be precisely controlled, ensuring that after the second adhesive layer 50a is cured, the second adhesive layer 50a can fill up the first spacing D1, the second spacing D2, and the third spacing D3, and the second adhesive layer 50a is not adhered on the photosensitive region 22 of the photosensitive element 20.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A camera device comprising:
   a circuit board having an assembling hole, a first surface, and a second surface opposite to the first surface, wherein the assembling hole penetrates the first surface and the second surface, and the assembling hole has an inner annular surface;
   a photosensitive element in the assembling hole, wherein the photosensitive element has a front surface, a back surface, and an outer peripheral portion, the outer peripheral portion is connected between the front surface and the back surface, the front surface has a photosensitive region and a non-photosensitive region, and the non-photosensitive region is around the photosensitive region;
   a first adhesive layer adhesively fixed to the outer peripheral portion of the photosensitive element and the inner annular surface of the assembling hole;
   a lens assembly disposed on the first surface, wherein the lens assembly comprises a base and a lens, the lens is disposed on the base, the position of the lens corresponds to the position of the photosensitive element, and the lens has an optical axis; the base comprises a bottom wall and an extension member, the bottom wall has a bottom surface, the extension member extends from the bottom wall and has a limiting surface; the bottom surface overlaps the first surface in a direction along the optical axis, and the limiting surface overlaps the non-photosensitive region of the photosensitive element in the direction along the optical axis; and a second adhesive layer between the base and the circuit board, wherein the second adhesive layer has a positioning block and a limiting block, the positioning block is adhesively fixed to the bottom surface of the base and the first surface of the circuit board, and the limiting block is adhesively fixed to the limiting surface of the extension member and the non-photosensitive region of the photosensitive element;

wherein the first adhesive layer is different from the second adhesive layer, the second adhesive layer is a light curing adhesive layer, and the first adhesive layer is a non-light curing adhesive layer.

2. The camera device according to claim 1, wherein the limiting block of the second adhesive layer is further adhesively fixed to the inner annular surface of the assembling hole and the first adhesive layer.

3. The camera device according to claim 1, wherein the base has an axle hole, the lens is in the axle hole, the base comprises a plurality of the extension members, the extension members are spaced apart from each other to surround the axle hole, the second adhesive layer comprises a plurality of the limiting blocks, and each of the limiting blocks is adhesively fixed to the limiting surface of a corresponding one of the extension members and the non-photosensitive region.

4. The camera device according to claim 1, wherein the non-photosensitive region is further divided into an adhering region and a non-adhering region, the non-adhering region is between the photosensitive region and the adhering region, and the limiting block of the second adhesive layer is adhesively fixed to the adhering region.

5. The camera device according to claim 1, wherein the bottom surface and the limiting surface of the base are at a same plane.

6. The camera device according to claim 1, wherein a thickness of the photosensitive element is less than a thickness of the circuit board, the photosensitive element is adjacent to the second surface, and the extension member further extends into the assembling hole, so that the limiting surface is in the assembling hole.

7. The camera device according to claim 6, wherein a first spacing is between the extension member and the inner annular surface of the assembling hole, a second spacing is between the limiting surface of the extension member and the non-photosensitive region, and the limiting block of the second adhesive layer is adhesively fixed within the first spacing and the second spacing.

8. The camera device according to claim 7, wherein a third spacing is between the bottom surface of the base and the first surface of the circuit board, and the positioning block of the second adhesive layer is adhesively fixed within the third spacing.

9. The camera device according to claim 8, wherein at least two among the first spacing, the second spacing, and the third spacing are different from each other.

10. The camera device according to claim 9, wherein the third spacing is greater than the first spacing and is greater than the second spacing.

11. The camera device according to claim 9, wherein the first spacing is less than the second spacing.

* * * * *